United States Patent [19]
Pilarczyk

[11] 3,942,908
[45] Mar. 9, 1976

[54] GAS TURBINE DRIVEN HIGH SPEED CENTRIFUGAL COMPRESSOR UNIT

[75] Inventor: Karol Pilarczyk, Loudonville, N.Y.

[73] Assignee: Norwalk-Turbo, Inc., Latham, N.Y.

[22] Filed: Apr. 25, 1975

[21] Appl. No.: 571,612

Related U.S. Application Data

[62] Division of Ser. No. 466,877, May 3, 1974.

[52] U.S. Cl. ....... 415/199 A; 415/219 A; 415/219 C
[51] Int. Cl.² .......................................... F04D 29/44
[58] Field of Search.... 415/108, 198, 199 A, 219 C, 415/219 A

[56] References Cited
UNITED STATES PATENTS

| | | | |
|---|---|---|---|
| 1,837,873 | 12/1931 | MacMeeken | 415/199 A |
| 2,474,077 | 6/1949 | Trumpler | 415/199 A |
| 3,044,684 | 7/1962 | Fullemann | 415/199 A |
| 3,051,090 | 8/1962 | Zumbusch | 415/199 A |
| 3,105,632 | 10/1963 | Tanzberger | 415/199 A |
| 3,188,967 | 6/1965 | Glessner | 415/199 A |
| 3,733,145 | 5/1973 | Kaplansky et al. | 415/199 A |
| 3,801,217 | 4/1974 | Ryall et al. | 415/199 A |
| 3,825,368 | 7/1974 | Benjamin | 415/219 C |

FOREIGN PATENTS OR APPLICATIONS

| | | | |
|---|---|---|---|
| 25,391 | 1905 | United Kingdom | 415/199 A |
| 447,994 | 5/1936 | United Kingdom | 415/199 A |
| 460,489 | 1/1937 | United Kingdom | 415/199 A |
| 645,921 | 8/1948 | United Kingdom | 415/199 A |
| 838,317 | 6/1960 | United Kingdom | 415/199 A |

*Primary Examiner*—Henry F. Raduazo
*Attorney, Agent, or Firm*—Roland T. Bryan

[57] ABSTRACT

A high speed centrifugal compressor is closely directly coupled to the power turbine of a two-shaft gas turbine having a gas generator section separate from its power turbine. The compressor stage assembly elements are conveniently interfitted together in the vertically split compressor casing by means of compression bolts minimizing fastening means. The gas turbine-compressor finds particularly useful application in areas where high power, compact, relatively maintenance-free units are required, as, for example, on offshore platforms in the natural gas industry.

1 Claim, 6 Drawing Figures

GAS TURBINE DRIVEN HIGH SPEED CENTRIFUGAL COMPRESSOR UNIT

BACKGROUND OF THE INVENTION

This application is a division of an application Ser. No. 466,877, filed May 3, 1974 and pursuant to a requirement of restriction.

This invention relates to high speed centrifugal compressors and more particularly to a high speed centrifugal compressor driven by a gas turbine. Centrifugal compressors find applications in various fields and increasing utility in the expanding natural gas industry for such services as gas gathering, boosting, transmission, repressuring and distribution, and the like. In the gas boosting area particularly, there is a need for high speed centrifugal compressors which will operate relatively maintenance free, are compact for ease of transportation and installation on site and which are driven by prime movers which use readily available energy sources. Thus, it would be desirable in the natural gas industry, as well as in the process industry, to have available a high-speed compressor which together with its prime mover provides compact, efficient, comparatively maintenance free operation.

Previously, centrifugal compressors have only been able to operate at high shaft speeds through the use of gear trains interposed between the compressor and the prime mover. However, the use of gear trains not only requires operation supervision, because of lubrication requirements and the like, but may also give rise to maintenance problems typically associated with the presence of moving parts which are subject to wear and breakdown. In addition, the presence of a gear train increases the size and weight of the overall compressor-prime mover unit. While gas turbine engines are capable of delivering high horse power in a compact unit and can provide high shaft speed, their use to drive centrifugal compressors has heretofore not been entirely satisfactory. In particular, the use of turbine engines to drive compressors has led to disadvantages arising from problems of mechanical alignment due to the mechanical coupling between the compressor shaft and the turbine engine power output shaft. These mechanical alignment problems are compounded where the turbine engine has mechanically connected gas compressor and power turbine stages.

Due to the aforementioned drawbacks, there has not previously been available a combined high speed centrifugal compressor-prime mover unit which is both compact and efficient in operation as well as free from alignment and maintenance problems so as to be suitable for process and natural gas industry uses including uses as diverse as offshore platform gas operations.

SUMMARY OF THE INVENTION

The present invention overcomes the disadvantages associated with prior art compressors by providing a high-speed centrifugal compressor closely and directly connected to the power turbine of a two-shaft gas turbine having a gas generator section separate from its power turbine. Through direct coupling of the compressor shaft to the turbine engine power turbine output shaft, the compressor shaft rotates at the same high speed as the speed of rotation of the power turbine. Thus, according to this invention, a centrifugal compressor having a plurality of stages may be driven by a gas turbine engine having a power shaft rotation of 33,000 rpm in a 650 nominal horse power engine with the result that natural gas compression at pressure ratios up to 6 to 1 may be obtained in a compact and efficient compressor-driver unit. The compactness and light weight of such a unit is exemplified by the fact that it takes up only 16 square feet of floor area and weighs approximately 3,400 pounds, making it readily trailer mounted for ease of transportation by light truck or by air lift to on site locations such as offshore platforms. Arranged in series, such units can compress gas from as low as atmospheric pressure to as high as 1500 psig. Used in parallel, large gas flows can be handled.

The oil seals and bearings may be advantageously contained together in a cartridge assembly providing for ease of oil feed and maintenance. If desired, high pressure oil may be fed to the oil seal within the cartridge assembly and therein fed to the bearings after having its pressure reduced by orifice passageways contained therein. Therefore, another object of this invention is the provision of an oil seal and bearing cartridge assembly which facilitates gas sealing and lubrication of the compressor rotating shaft.

The compressor may include one to four stages to obtain pressure ratios as high as 6 to 1 in the natural gas applications. The compressor casing is the vertically split type having in-line inlet and discharge openings. The stage elements include an impeller, an inlet guide vane assembly and a diaphragm containing return vanes. Through casting of the elements largely as an integral piece the number of parts required is minimized. The stage elements are assembled within the bore of the casing in stacked concentric relationship in barrel fashion without the need for fastening bolts or the like since the parts interfit with one another and with the casing and are maintained together through compression fit. Hence, another object of this invention is the provision of a compressor structure which utilizes a minimum amount of parts and fastening means for assembly through interengagement compression fit.

BRIEF DESCRIPTION OF THE DRAWINGS

The above objects, aspects and advantages of the invention as well as others will become more apparent from the following detailed description of a preferred embodiment of the invention as shown in the drawings herewith in which.

DETAILED DESCRIPTION OF THE DRAWINGS

Figure 1:
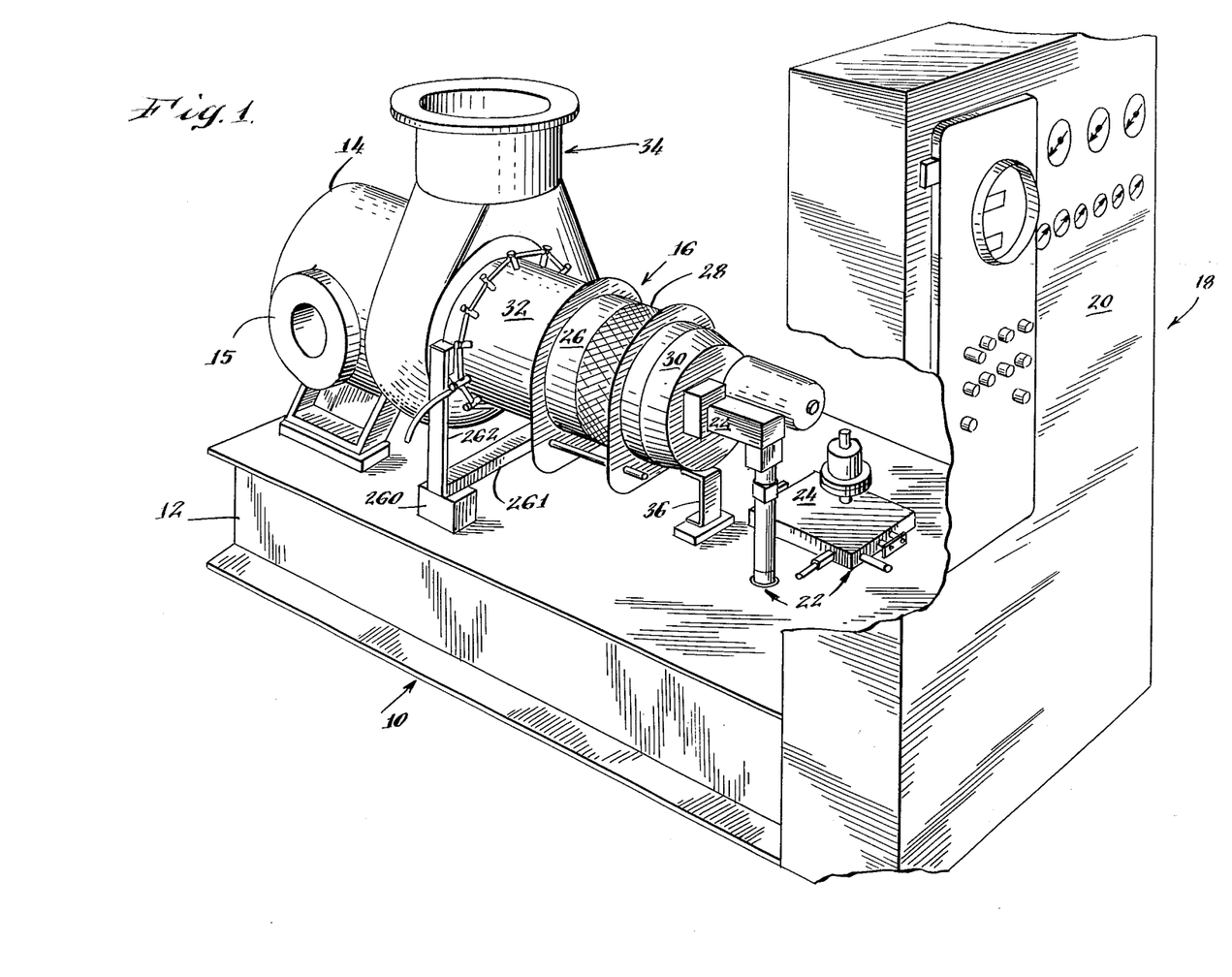
FIG. 1 is a perspective view of a complete compressor-gas turbine unit package incorporating the features of the present invention.

Referring to FIG. 1 there is shown a complete compressor-gas turbine unit package indicated generally at 10. The complete compressor-gas turbine unit package includes a rigid base plate 12 on which is mounted a centrifugal compressor 14, a gas turbine engine 16 and a control system 18 for continuous duty and fully automatic unattended operation. As shown generally on the control system panel 20, the control system may include means for indicating speed, pressure and temperature, as well as automatic starting, running and protective shut down controls. Also shown generally, as part of the compressor-gas turbine unit package 10 of FIG. 1 are the compressor lubrication oil and sealing oil system, shown generally at 22, with the oil distribution manifold and filter means 24.

The gas turbine engine 16 includes a gas generator section 26 having an annular screened air inlet 28. The gas generator section of the turbine engine also includes an accessory gear box 30. The combustion and power output section of the gas turbine engine is shown generally at 32 while the hot gas discharge exhaust is shown at 34.

The gas generator section 26 of the gas turbine is of conventional design and may be of the type available from United Aircraft of Canada Ltd., under the designation Pratt & Whitney ST6. The gas generator section has no mechanical connection between its compressor turbine and the power turbine of the engine so that the engine has two shafts, a compressor section shaft and a power output transfer shaft connected to the power turbine. The commercially available gas generator section 26 may have its own lubrication system integral with the gas turbine. Also included with the conventional gas generator section is an accessory gear box 30 which may be utilized in this package to drive the pump of the force feed oil system 22. Since the gas generator section 26 is essentially a self-contained unit, it may be readily mounted directly on the power turbine exhaust discharge case and is easily disconnected therefrom without the need for any time consuming major disassembly of piping or other equipment. The gas generator section 26 is mounted on the rigid base plate 12 by means of a flex plate 36 located at its forward end away from the power turbine section. The flex plate 36 is sufficiently rigid to support the gas generator section 26 while sufficient flexible to permit expansion, due to forces generated by heat stresses, in the direction of the axis or rotation of the compressor of the gas generator. The ST6 gas generator commercially available is a short compact unit which when coupled with a power output section can provide approximately 655 horse power with a power output shaft rotation as high as 33,000 rpm.

Figure 2:
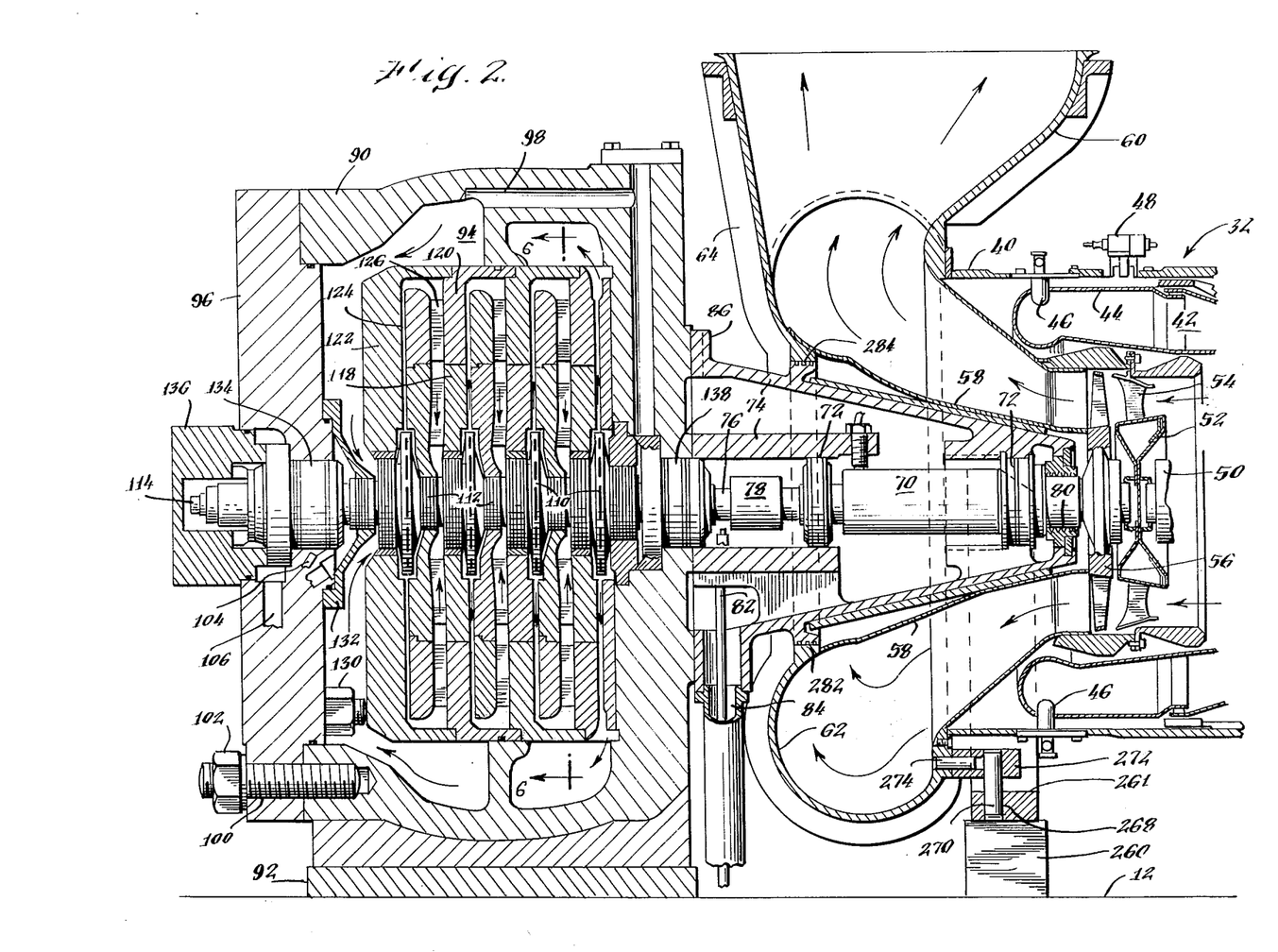
FIG. 2 is a cross-sectional view taken along a vertical plane through the axis of rotation of the compressor and power turbine showing the compressor and the power turbine section of the gas turbine engine.

Referring to FIG. 2, there is shown a cross-sectional view taken vertically through the axis of rotation of the compressor and including the compressor 14 and the combustion and power output section 32 of the turbine engine 16. The gas generator section, being conventional, is not shown in detail. The combustion and power section 32 includes the turbine outer wall barrel 40 ssurrounding an annular combustion chamber 42. Compressed air from the gas generator section enters the combustion chamber 42 from the area between the outer turbine casing 40 through the perforated combustion chamber lining 44. Fuel nozzles 46 project into the combustion chamber 42 while an ignitor assembly is shown at 48. Partially shown is a portion of the hub of the engine compressor turbine wheel 50 to the right of the separator 52.

As shown by the arrows in FIG. 2, after passing through the compressor turbine wheel, the combustion gases pass through the diffuser vanes 54 and impinge upon the power turbine wheel 56 to drive it. Stainless steel liners 58 direct the exhaust gases to the turbine exhaust discharge casing 60. The discharge casing has an annular partial toroidal shape as shown at 62 which exhausts the gases to the atmosphere through the bell mouth discharge exhaust 34. The discharge casing 60 is a unitary cast iron structure which is mounted on the base plate 12 by means of flex plates. The exhaust discharge casing 60 is covered with insulation as shown at 64.

The power turbine wheel 56 is mounted on power transfer shaft 70 which rotates in tilting shoe bearings 72 mounted in bearing bracket 74. In the embodiment shown in FIG. 2, the power transfer shaft 70 is joined to the compressor power input shaft 76 by means of a splined tooth coupling 78. A hot gas seal 80 prevents the hot turbine gases from leaking into the bearing bracket area. Means for feeding lubricating oil to the tilting shoe bearings 72 are shown at 82 while a drain for spent oil is shown at 84. The drain 84 also acts as a shield of the lube oil feed means 82 so that in the event that the lube oil feed means 82 should rupture, oil will not be sprayed on the hot gas discharge casing 60. The bearing bracket interior is vented to the atmosphere at 86.

The centrifugal compressor shown in FIG. 2 is of barrel-type construction having a vertically split steel casing 90 incorporating in-line inlet and discharge flanges. The discharge flange 15 is shown in FIG. 1. The compressor casng 90 is rigidly secured to the base plate 12 by means of the compressor base 92. The compressor casing 90 is of one-piece cast construction which is further machined to have a bore or chamber 94 which accepts the stage elements of the centrifugal compressor. A compressor end cover 96 further defines the chamber while the bore vent 98 provides a pressure balancing line. The end cover 96 is removably secured to the casing 90 by means of studs 100 and stud nuts 102. Machined into the end cover 96 are an oil feed line 104 and oil drains 106.

Figure 6:
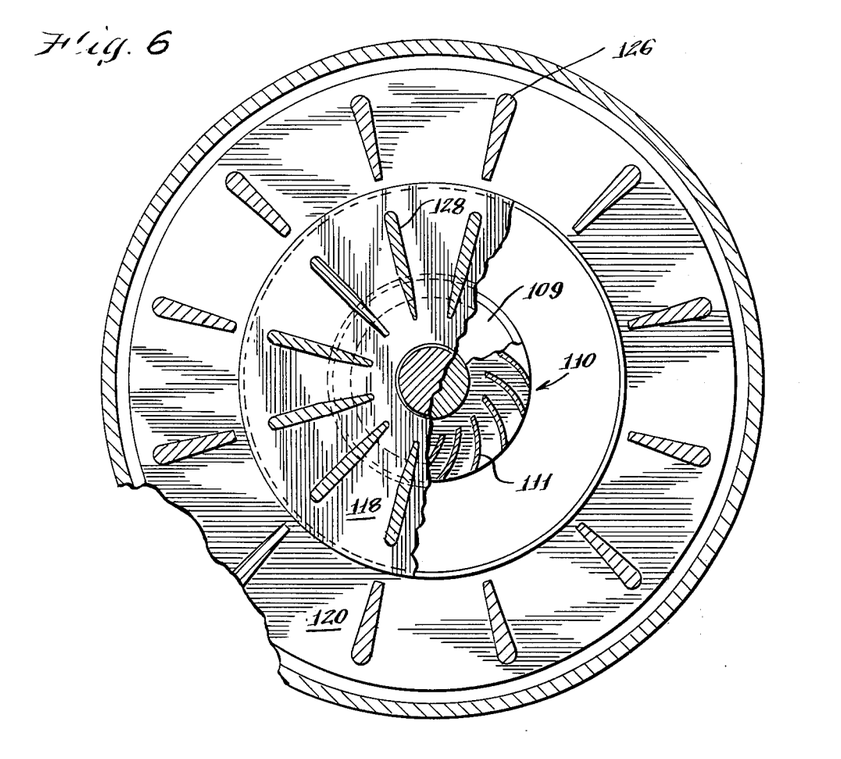
FIG. 6 is a partial cross-sectional view taken along line 10—10 in FIG. 2 normal to the axis of rotation of the compressor and showing the compressor stage ele-

The compressor embodiment illustrated in FIG. 2 contains four stages, each stage being substantially comprised of the following similar elements shown in FIG. 2 and partly in cross-section in FIG. 6. Referring to FIGS. 2 and 6, there are seen the impellers 110 mounted together with labyrinth seals 112 in a rotor assembly which is joined together under tension by means of a tension bolt 114. Each stage is made up of an impeller 110, a guide vane assembly 118 and a diaphragm 120. An interstage seal 112 is also provided. The impeller 110 has blades 111 which are covered by the impeller shroud 109 indicated generally. The impeller may be of the open-face or shrouded type shown as illustrative, it being understood by those skilled in the art that the blade characteristics can be selected by the designer according to known procedures to suit the service conditions required. Positioned over the impeller 110 is the inlet guide vane assembly 118 which has integrally cast therein guide vanes 128. The inlet guide vane assembly 118 is horizontally split for positioning over the impeller 110 prior to assembly in the compressor casing 90. Each half of the inlet guide vane assembly is of one-piece cast construction. Concentrically surrounding the inlet guide vane assembly 118 is a diaphragm 120 shown in total cross-section in FIG. 6 exposing the return vanes 126. The diaphragm is of one-piece cast construction with the return vanes 126 integrally cast therein. As seen in FIG. 2, the stacked stage elements interfit with one another to form a tight barrel assembly which tightly fits within the compressor casing 90 and is held therein by means of compressor bolts as shown at 130. Conventional O-ring sealing means may be provided to assure a tight fit, however, no special fastening means are required because of the excellent interengagement of parts. Gas flow is shown by the arrows.

FIG. 6 is illustrative of the juxtaposition of stage elements, however, it is to be understood that impeller selection and guide and return vane size and shape as well as relative alignment may be varied by the designer according to known principles in order to achieve optimum aerodynamic performance for each secific stage for the service conditions encountered. Similarly, materials of construction for such parts are known and may be selected accordingly.

Referring to FIG. 2, the first diaphragm and guide vane assembly, proceeding from left to right, form with the inlet shroud 122 a vanelesss diffuser passageway 124 to conduct compressed gas from the discharge of the impeller 110 to the next stage. From the vaneless diffuser 124, the gas passes through the return vanes 126 of the diaphragm and thence through the guide vanes 128 to the inlet of the impeller of the next stage. A shroud 132 covers a cartridge assembly 134 containing the thrust bearing and oil seal for the compressor rotor shaft at the intake end. This entire cartridge assembly is covered with an end cover 136. The compressor shaft also rotates within a cartridge assembly 138 at the outlet end of the compressor which also contains a journal bearing and oil seal.

Although the compressor embodiment shown in FIG. 2 has four stages, a compressor according to this invention may have from one to four stages of compression, even in the identical casing 90, if desired, by utilizing appropriately sized elements. For example, in a single stage embodiment the cartridge assembly 138 with its thrust bearing and oil seal can be eliminated by providing the impeller and other stage elements at the extreme right side of the compressor in the area occupied by stages three and four of the compressor shown in FIG. 2. Furthermore, the impeller of a single stage unit may be mounted on a shaft which is integral with the power transfer shaft 70 thus eliminating the coupling 78 and the bearing 72 nearest thereto. Thus, the impeller of a single stage compressor embodiment may be mounted on the cantilevered portion of an overhung shaft while still providing the close direct coupling to the power turbine wheel 56.

Figure 3:
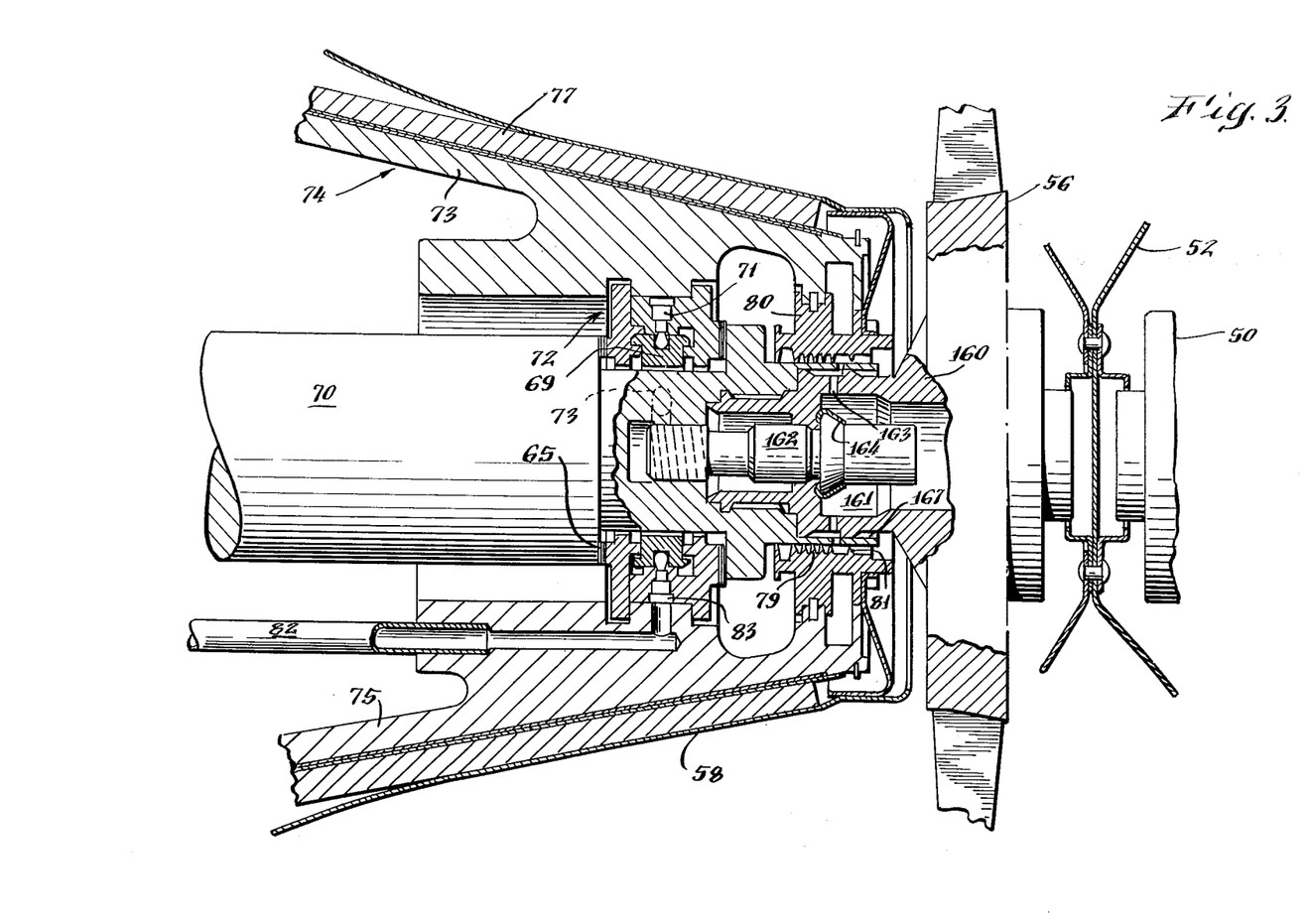
FIG. 3 is a vertical cross-sectional view showing, in enlarged detail, the turbine power section including the power transfer shaft and hot gas seal.

FIG. 3 shows in enlarged detail the power wheel 56 assembled to the power transfer shaft 70. The power wheel 56 has a hollow shaft 160 which is joined to the power transfer shaft 70 by means of a spline and a tightening bolt 162 secured in place by lock ring 164. The power transfer shaft rotates within tilting-shoe journal bearing 72 and hot gas seal 80, as shown also in FIG. 2. The journal bearing 72 and hot gas seal 80 are held in the bearing bracket 74 comprised of an upper half bearing bracket 73 and a lower half bearing bracket 75 shown covered with insulation 77. The hot gas seal 80 has labyrinth sealing edges 79 which seal surface of the rotating power transfer shaft 70. The sealing edge of vane shown at 81 constitutes a metering vane which operates in the following manner.

Cooling air utilized in the turbine passes through the hollow shaft 160 of the power turbine 56 and into the cavity 161 therein. From the cavity 161, this cooling air passes through the opening 163 in the shaft 160 and through opening 165 in the cylindrical collar 167 of the power transfer shaft 70 to pass over the edge of the metering vane 81 from whence it is drawn along the edge of the power turbine 56 and, by venturi effect, along the inside of the combustion chamber liner 58 for cooling thereof.

Also shown in detail in FIG. 3, is the journal bearing 72 comprised of a housing 67 within which are circumferentially positioned tilting shoes 69 held in place by positioning means shown generally at 71. The bearing housing may be split and the halves joined together by means indicated generally at 73. Lubricating oil is fed into this journal bearing 72 through the lubricating oil line 82, an extension of the line shown in FIG. 2, through the lower bearing bracket 75 into an annular recess 83 of the bearing housing 67. The oil flows over the shoe 69 within the bearing and leaks out over the top of the shoe 69 into the bearing bracket area from which it is eventually drained through the drain 84 shown in FIG. 2. The bearing 72 carrying the end of the power transfer shaft 70 may operate not only as a journal bearing but also functions as a thrust bearing with annular thrust faces shown at 65.

Figure 4:
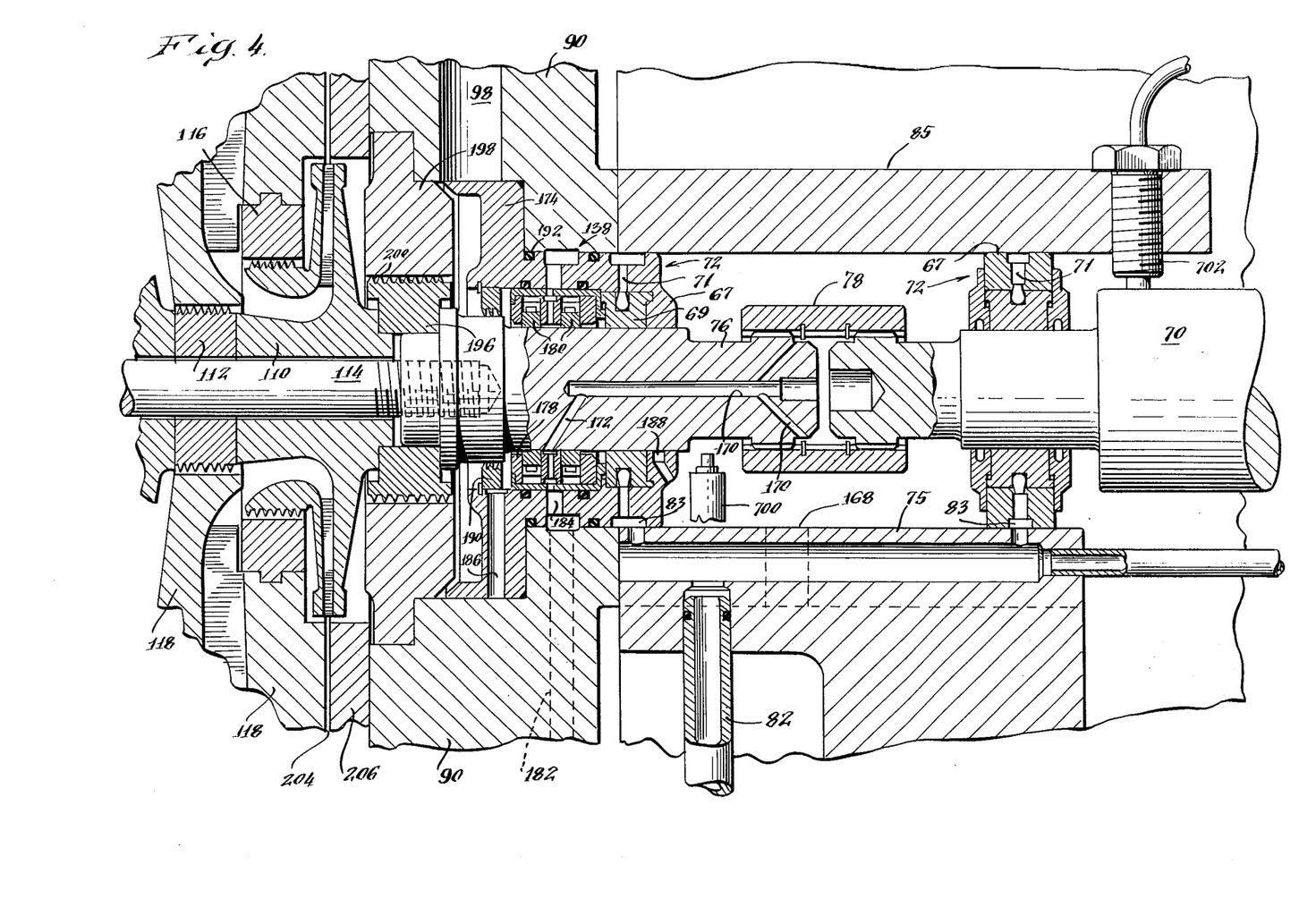
FIG. 4 is a vertical cross-sectional view showing, in enlarged detail, the direct close coupling between the compressor shaft and power transfer shaft including the journal bearing and oil seal cartridge assembly therein.

Referring now to FIG. 4, there is shown, in enlarged detail the area of the direct coupling between the power transfer shaft 70 and the compressor power input shaft 76. As shown in FIG. 2 also, the power transfer shaft 70 rotates within a tilting shoe bearing 72 positioned in the inner cap 85 and lower half 75 of bearing bracket 74. The bearing 72 is similar to the other tilting shoe journal bearing and like parts are therefore identified by like numbers. The compressor shaft 76 is joined to the power transfer shaft 70 by a splined-tooth coupling 78. The compressor shaft 76 contains passageways 170 by which oil is fed to the coupling 78 which is of the self-aligning type. The oil from this coupling enters the bearing bracket area and is drained to the drain 84, shown in FIG. 2, via the drain 168. The oil in passageways 170 originates from the high pressure sealing oil system via sealing feed line 182 and its high pressure reduced by the passageway 172 which functions as a pressure-reducing orifice.

The compressor shaft 76 rotates within a journal bearing and seal cartridge assembly 138. The journal bearing and the seal cartridge assembly 138 is comprised of a housing 174 which contains a tilting shoe journal bearing 72 of the type surrounding the power transfer shaft previously described in reference to FIG. 3. Like numbers here indicate similar elements. The housing 174 also contains a floating carbon ring seal identified generally at 176. The carbon ring seal 176 contains, within a housing 178, carbon rings 180 over the surface of which passes high pressure sealing oil to form an effective gas seal. The sealing oil is introduced via the sealing oil feed line 182 within the compressor casing 90 and enters the cartridge housing 174 and sealing ring through the oil passageway 184. The sealing oil passes over the top of the carbon rings and a quantity is passed through the reducing orifice 172 for lubrication of the coupling 78.

Oil continuously flows over the surface of the carbon seal rings and out the drain 186 in the casing 90, as well as through the drain 188 located in the housing 174 which collects the oil from both the journal bearing and the sealing ring. While the lubrication oil is generally at a pressure ranging from 15 to 35 psig the sealing oil must be at pressure 10 to 25 psi higher than the pressure of the gas in the compressor in order to insure against gas leakage. The oil seal and bearings are partially sealed from the high pressure region of the compressor by means of a labyrinth gas seal 190. The entire journal bearing and oil seal cartridge assembly 138 is maintained in place in the compressor casing 90 through a tight sealing fit with O-rings shown generally at 192.

The compressor power input shaft 76 is joined to the rotor assembly, shown generally at 194 by means of the tie bolt 114. The rotor assembly comprises the impellers 110 and labyrinth seals 112 maintained together under tension by means of tie bolt 114 which is placed through the rotor assembly elements threaded into the compressor shaft 76 and tensioned prior to securing. The shaft 76 and rotor assembly 194 juxtapose the balancing drum 196 which rotates in the balancing ring 198 fitted into the compressor casing 90. The balancing drum 196 has vanes 200 to provide a gas seal. Referring to FIG. 2, there can be seen the balancing line vent 98, also shown in greater detail in FIG. 4; which equalizes pressure on the ends of the rotor assembly within the compressor by permitting the gas to exert a force on both ends thereof. Here, the force will be exerted on the face of the balancing drum exposed in the cavity area 202. Also seen in FIG. 4 are portions of the stage elements, namely, the impeller 110, interstage seal 116 and the inlet guide vane assembly 118. A discharge passageway for the high pressure gas is shown at 204 formed by the guide vane assembly 118 and end plate 206.

Figure 5:
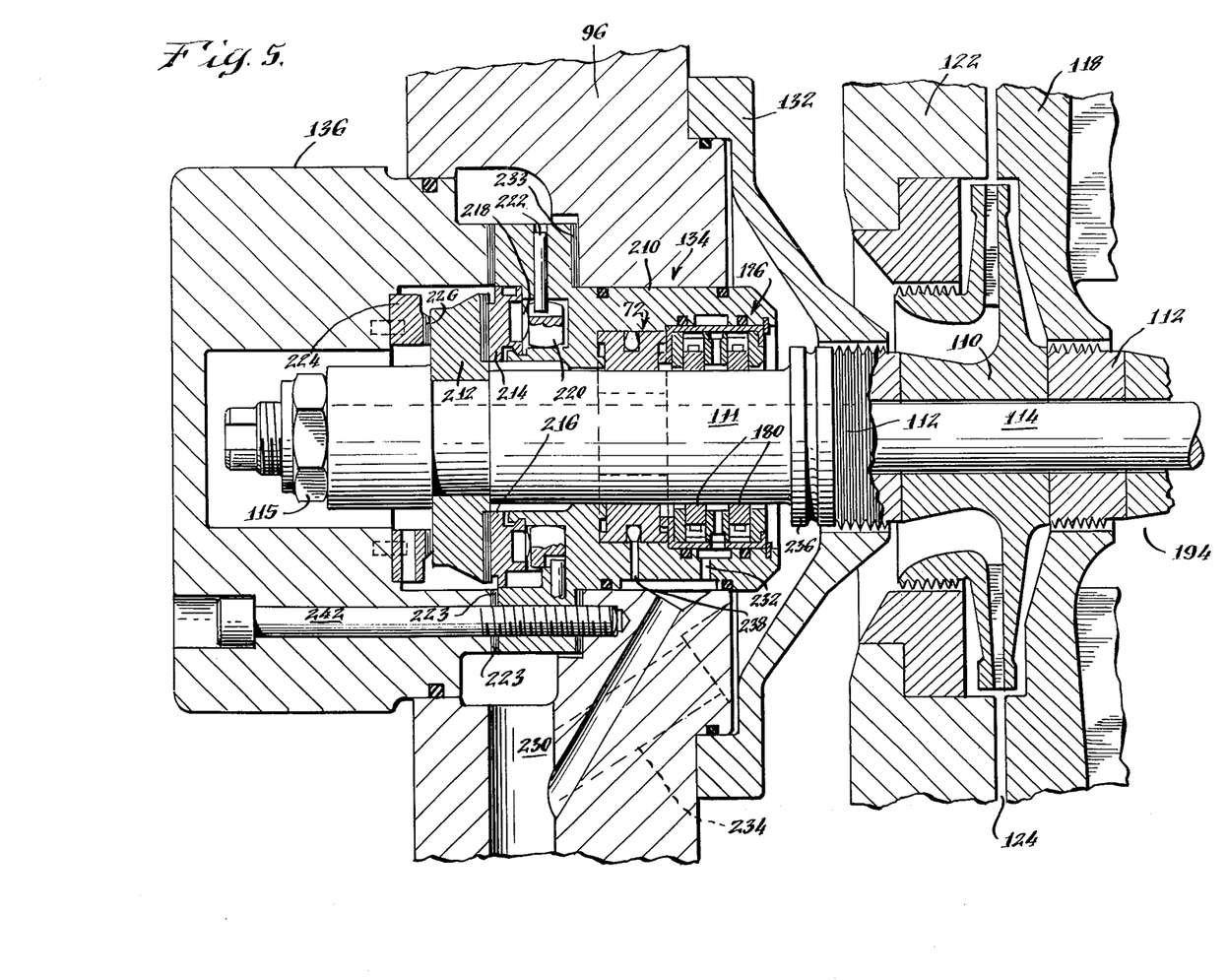
FIG. 5 is a vertical cross-sectional view showing, in enlarged detail, the compressor inlet area including the thrust bearing and oil seal cartridge assembly and means for feeding oil thereto.

FIG. 5 shows, in enlarged detail, the rotor assembly 194 in the area of the first stage of the compressor and the manner in which it rotates in the bearings and seals in the cartridge assembly 134 in the compressor end cover 96. The rotor assembly includes a stub shaft 111 which is joined to the impellers 110 and labyrinth seals 112 by means of the tie bolt 114. For assembly, the rotor elements are stacked together and the tie bolt 114 passed therethrough and tensioned. While the bolt 114 is tensioned, tightening nut 115 is tightened so that secure compression fit is achieved upon release of tensioning of the bolt 114.

Positioned in the casing end cover 96 is the thrust bearing and seal cartridge assembly 134. This cartridge assembly includes the end cover 136 and a housing 210 which contain the rotating thrust runner 212 and the stationary thrust shoe 214. The thrust shoe 214 is an annular element having thrust faces 216 on its contacting side and means permitting it to pivot on its rear side. These pivoting means are indicated at 218 as bearing against the plugs 220 held in place with rods 222. Individual thrust shoes assembled peripherally are also shown at 224 with thrust faces 226 which contact the thrust runner 212. Shims are shown at 223.

Also contained within the cartridge assembly housing 210, as shown in FIG. 5, are tilting shoe journal bearing 72 floating carbon ring oil seal 176, similar to those previously described also. Lubrication and sealing oil is obtained from high pressure sealing oil line 230 in casing and cover 96. The sealing oil passes to the sealing ring 176 through an oil passageway 232 and passes over the surfaces of the floating carbon rings 180 into the area between the shroud 132 and the end cover 96. There the oil drips into the drain shown by dotted lines at 234. Entrained in this oil may be gas which had leaked from the compressor gas area through the labyrinth seal 112. The seal 112 in this region has special edges 236 in the area between the shroud 132 and the end cover 96 to fling the oil outwardly and thence down through the drain.

In the cartridge assembly 134 of FIG. 5, sealing oil is also used for lubrication purposes and thus its high pressure has to be reduced. This is accomplished by passage to the bearing areas through pressure reducing orifice passageways 238. Oil in the thrust runner bearing area is permitted to rise to a level so that the entire thrust runner 212 is bathed in oil. Any excess oil flows through a hole, not shown, in the cartridge housing and runs to the drain. The cartridge end cover 136 is secured to the casing end cover 96 by means of a bolt 242.

The gas turbine-compressor unit package shown and described generally and in detail herein in relation to an embodiment thereof is particularly suitable for natural gas application. Since the gas turbine and centrifugal compressor are relatively lighweight and there are not reciprocating forces, operation is smooth and vibration free and installation requires no foundation and comparatively little space. Thus, the unit is particularly versatile and adaptable to many uses. The gas generator is commercially available and readily disconnected from the unit without major disassembly of piping or other equipment.

I claim:

1. A high speed centrifugal compressor comprising a vertically split casing having in-line inlet and discharge openings, a barrel assembly constituting at least one compressor stage removably positioned within the casing, the barrel assembly including, in at least one stage assembly, an impeller, a split annular guide vane assembly means positioned concentrically over the impeller to partially surround it, an annular diaphragm means positioned concentrically over the annular guide vane assembly means, the guide vane assembly means and diaphragm together defining, at least in part, one wall of a vaneless diffuser passageway communicating with the impeller output, the guide vane assembly means having integrally cast guide vanes therein, the diaphragm means having integrally cast return vanes therein, the return vanes and guide vanes forming passageways to conduct gas from a lower stage of compression to the next stage of compression, the guide vane assembly means and diaphragm means interfitting with one another and with the compressor casing in compression force fit relationship therewith without the need for fastening means.

* * * * *